Jan. 31, 1939.    S. KURODA    2,145,627
ROTARY BRUSH TYPE CONVERTER WITH TRANSFORMER
Filed Dec. 12, 1936    2 Sheets-Sheet 1

INVENTOR.
S. Kuroda
BY
Glascock Downing & Seebold
ATTORNEYS.

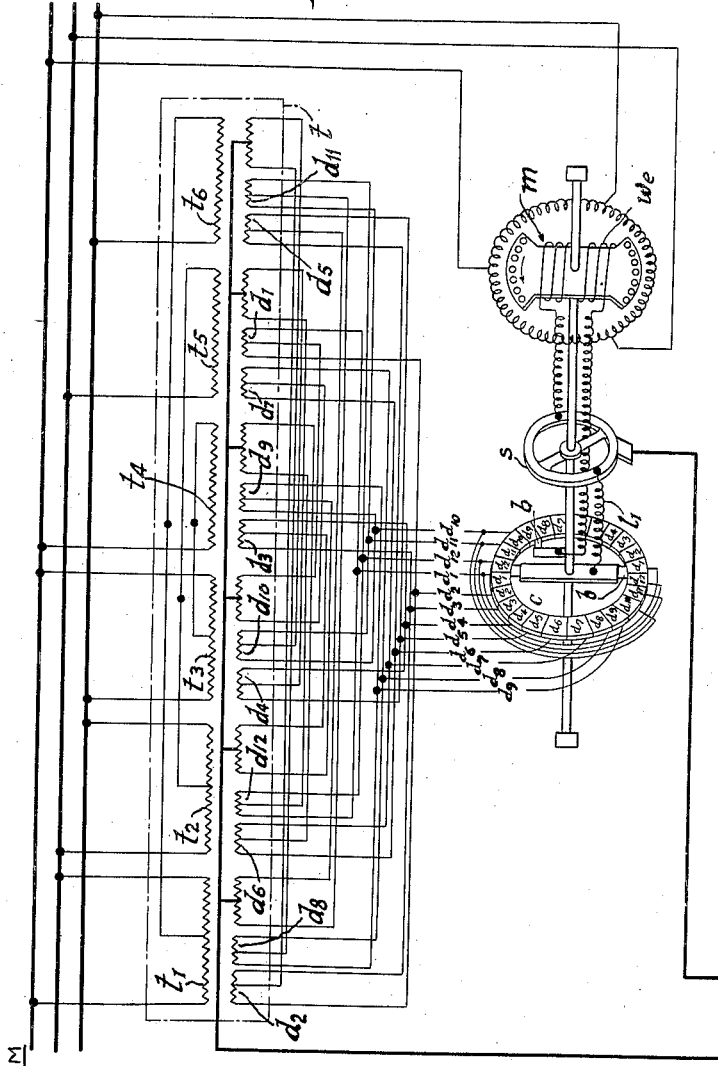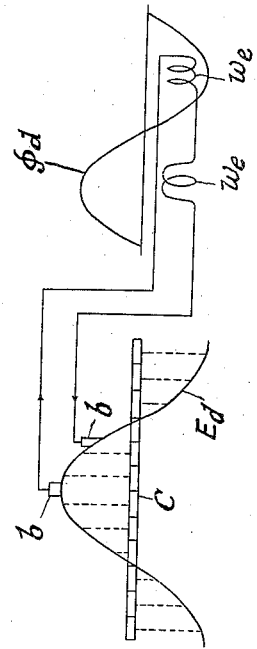

Patented Jan. 31, 1939

2,145,627

UNITED STATES PATENT OFFICE 2,145,627

ROTARY BRUSH TYPE CONVERTER WITH TRANSFORMER

Sadayosi Kuroda, Ganmiti-tyo, Nagoya-si, Japan

Application December 12, 1936, Serial No. 115,646
In Japan June 17, 1936

1 Claim. (Cl. 171—123)

This invention relates to rotary brush type converters with transformer and has for its object to provide a mechanically and electrically improved converter of this kind.

The invention relates to a rotary brush type converter having a transformer adapted to transform an alternating electric energy into a direct electric energy by rotary brushes in engagement with a stationary commutator on which is conducted a rotary potential set up on the secondary windings of a polyphased transformer characterized in that the connection of said secondary windings comprises in combination a ring connection in $n$-sided equilateral polygonal relation and another $n$-lined radial connection, on which are provided terminals for each phase, which being connected to corresponding segments of the commutator by means of leads in the order of phases, and said rotary brushes being arranged to be in engagement with the segments of the commutator at all times in phase with the maximum and minimum values of the rotary potential, a direct current being conducted to a slip ring having a connection to the brushes and an outgoing conductor connected to said slip ring, and returned through a conductor connected to the neutral point of said radial connection of the secondary windings.

The accompanying drawings illustrate an embodiment of the invention, in which.

Fig. 3 is a diagram illustrating relation between mutual inductions of primary and secondary windings of a transformer and connection thereof. Fig. 4 is a diagram illustrating relative phase of a rotary brush to rotary potential, relative phase of rotary field flux of a synchronous motor to direct current exciting coil and voltage source of direct current voltage impressed on direct current exciting coil of the synchronous motor.

Figure 1:
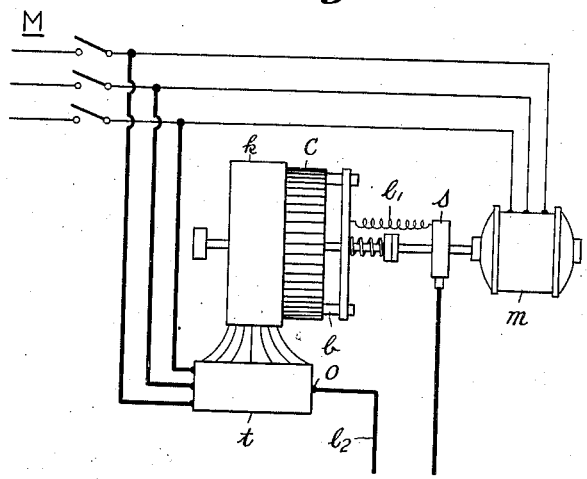
Fig. 1 is a diagrammatic view of a converter with transformer embodying the invention.

Referring now to Fig. 1, $t$ represents a transformer, the primary of which is supplied with current from mains indicated by M. The output of the secondary of the transformer is conducted through means of a distribution ring $k$ to the segments of a commutator $c$. The brushes $b$ engaging with the surface of the commutator $c$ are driven by a motor $m$, and direct current is conducted through means of a lead $l_1$ and a slip ring $s$ to a conductor. A return conductor $l_2$ is connected to the neutral point $o$ of the secondary windings of the transformer.

Figure 2:
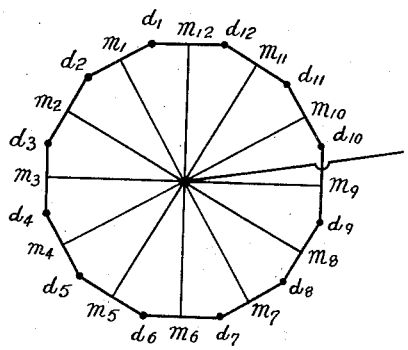
Fig. 2 shows a vector diagram of a connection of the secondary windings of the transformer.

Referring to the vector diagram as shown in Fig. 2, $d_1$, $d_2$, $d_3$ . . . $d_{12}$ correspond to twelve windings in ring-connection. Each segment of the commutator $c$ is to be connected to points $m_1$ . . . $m_{12}$ respectively. The radial lines $om_1$, $om_2$ . . . $om_{12}$ correspond to other twelve windings in star or radial-connection, each of which is at one end connected to the first mentioned windings respectively. One end of each of the windings in radial-connection is shown in Fig. 2 as connected to a point on the windings in ring-connection, but may be connected to the junction point of two adjacent windings in the windings in ring-connection.

Generally in polyphase alternating current apparatus, the speed of a rotary potential on windings extending through an electric angle $2\pi$ depend upon only frequency of alternating current supplied to said apparatus, and for example, when the current has a frequency of 60 cycles per second the speed of the rotary potential will be 3,600 revolutions per minute. In order that rotary brushes may be in engagement with a stationary commutator, on which the rotary potential of such speed is conducted, in phase with the maximum and minimum values of the rotary potential at all times, they must be rotated at a speed of 3,600 revolutions per minute. Since it is impractical to rotate the brushes at such high speed, distribution rings are provided to overcome this disadvantage.

When terminals for $n$ phases are provided on the secondary windings of a transformer and when $m$ in number of poles for each of $n$ phases are to be provided on the commutator, the distribution ring comprises $n$ in number of circular rings insulated from one another, to each of which are connected $m$ in number of deriving conductors, one at each of circumferentially equidivisional points of each ring, whereby $m$ sets of $n$ deriving conductors are obtained. The conductors in each set are arranged in the order of phases and connected to the commutator, one at each of the segments of the commutator included in an angle of $\frac{2\pi}{m}$. Thus, it will be seen that the commutator is provided with $n \times m$ in number of segments, and the speed of the rotary brushes may be reduced to desired extent by suitably selecting the number of $m$.

The advantages obtained by connecting the return conductor of direct current from the converter to the neutral point of the secondary windings of the transformer are as follows:

1. The brushes and slip ring for the return can be dispensed with, that is, the number of the brushes and slip rings necessary in a converter unit are reduced by half in comparison with otherwise case, and accordingly the weight of rotating elements is reduced by half to advantage for construction and operation.

2. Owing to the reduction by half of the number of the brushes the distortion of phase due to short-circuit on the part of the brushes in contact with the commutator face is reduced by half.

3. The voltage drop in the contact points of the brushes with the commutator is reduced by half owing to the reduction by half of the number of the brushes, and hence the efficiency is considerably increased, especially with a low-tension machine.

I claim:

A rotary brush type converter comprising a transformer, connection of secondary windings of which includes a ring connection in $n$-sided equilateral polygonal relation and another $n$-lined radial connection, a stationary commutator having a number of segments for desired number of phases and poles, a distribution ring for distributing a rotary potential set up on the secondary windings of the transformer into the segments of said commutator, a synchronous motor, rotary brushes driven by said synchronous motor in engagement with said commutator and a slip ring having a connection with the brushes from which direct current is taken off through an outgoing conductor, a return conductor connected with the neutral point of the secondary windings of the transformer.

SADAYOSI KURODA.